Feb. 15, 1949.  B. E. HORNE  2,461,982
CONTROL VALVE
Filed June 26, 1945  3 Sheets-Sheet 1
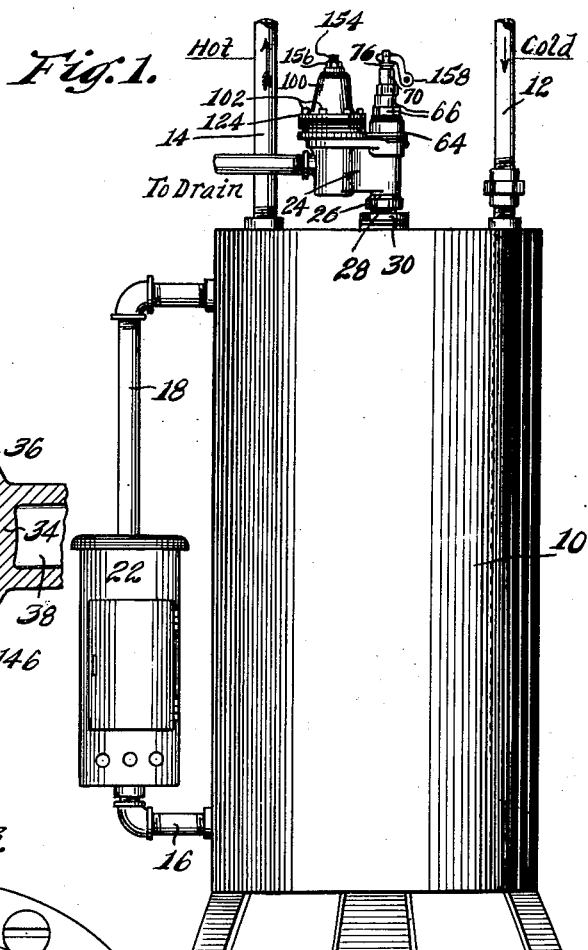
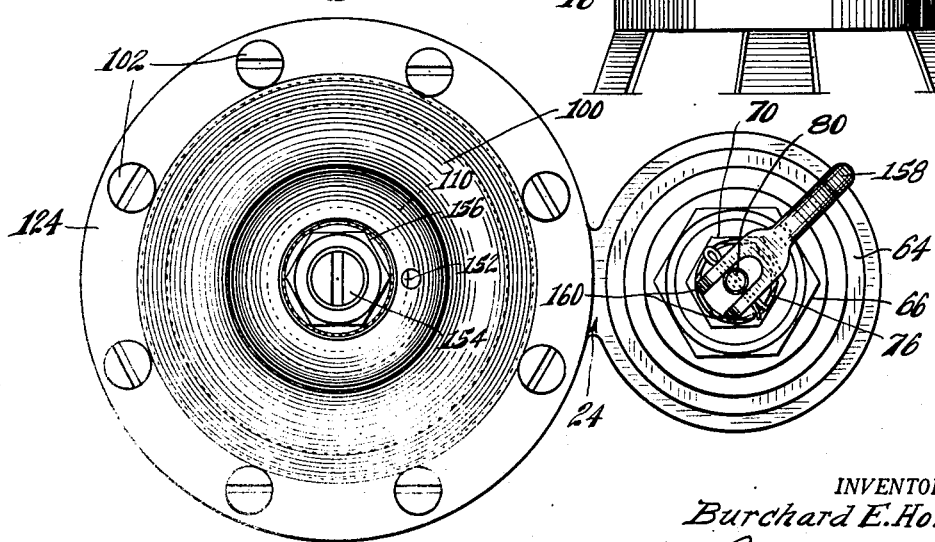
INVENTOR.
Burchard E. Horne.
BY Bair & Freeman
Atty's.

Feb. 15, 1949.　　　B. E. HORNE　　　2,461,982
CONTROL VALVE
Filed June 26, 1945　　　　　　　3 Sheets-Sheet 2
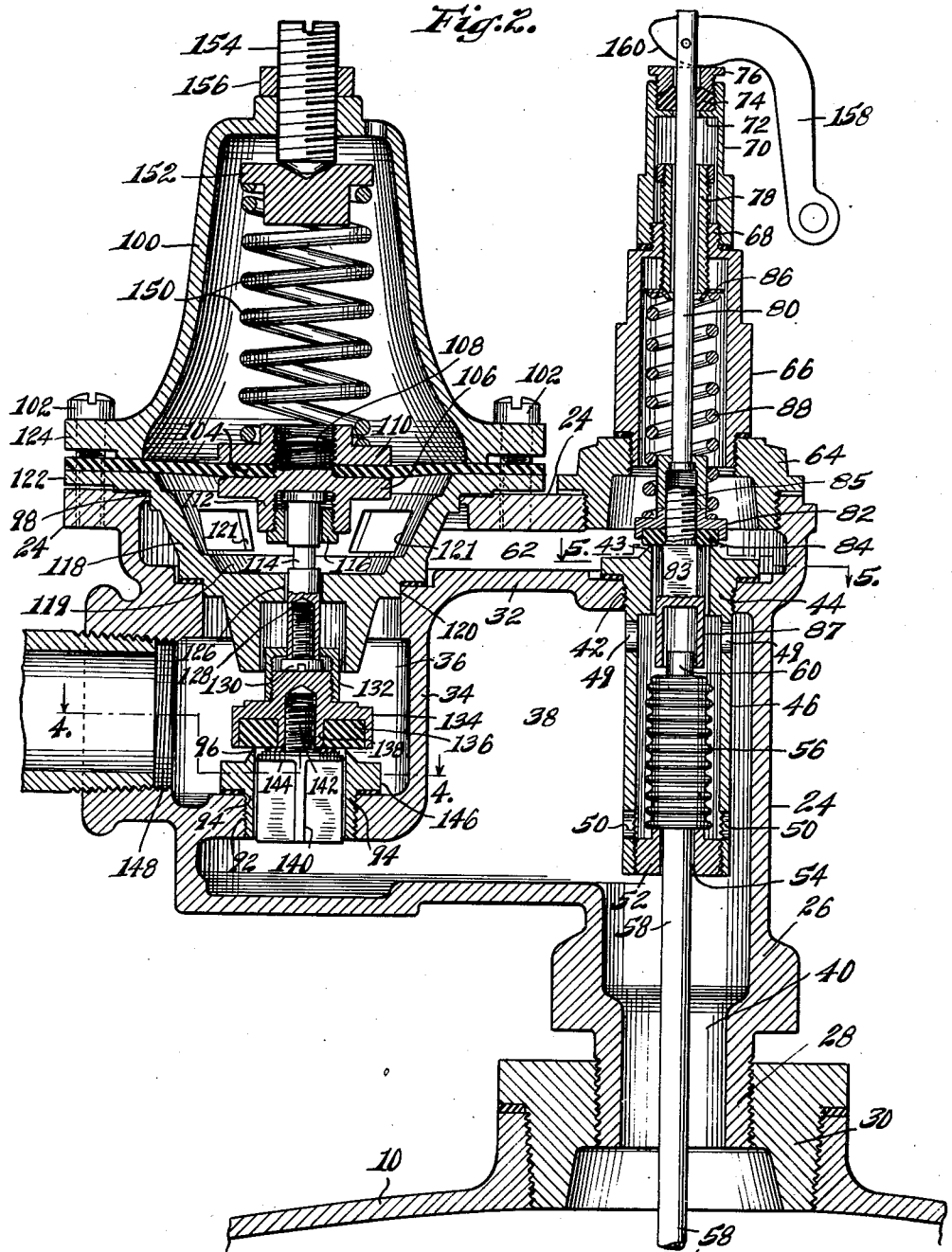
Fig. 2.
INVENTOR.
Burchard E. Horne
BY 
Att'ys.

Feb. 15, 1949.　　　　B. E. HORNE　　　　2,461,982
CONTROL VALVE
Filed June 26, 1945　　　　　　　　　　3 Sheets-Sheet 3
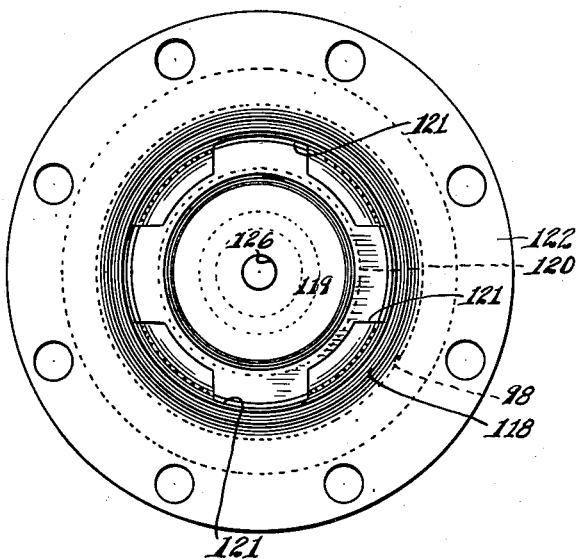
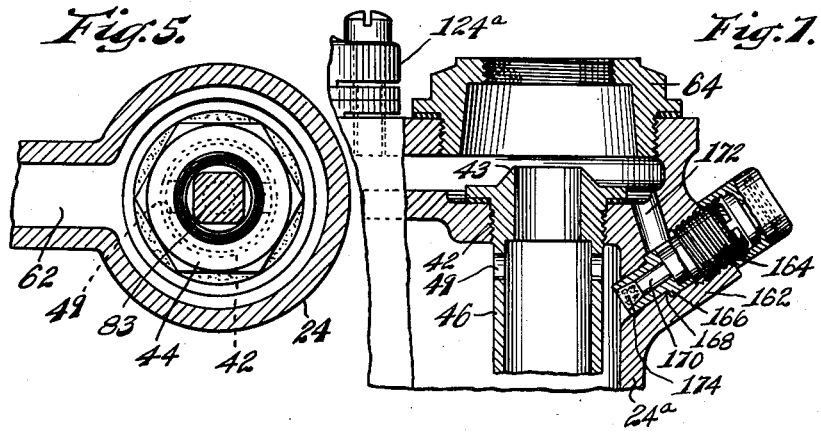
INVENTOR.
Burchard E. Horne.
BY Bair & Freeman
Atty's.

Patented Feb. 15, 1949

2,461,982

UNITED STATES PATENT OFFICE 2,461,982

CONTROL VALVE

Burchard E. Horne, Lawrence, Mass., assignor to Watts Regulator Company, Lawrence, Mass., a corporation of Massachusetts Application June 26, 1945, Serial No. 601,563

4 Claims. (Cl. 236—80)

My invention relates to a temperature and pressure relief control used for preventing the over-heating of hot water supply systems in homes, industrial establishments, barracks, etc.

It is generally my purpose to make a temperature and pressure relief control which affords protection against excessive pressure, as well as excessive temperature in a hot water supply system or tank. Excessive pressure in such a tank or system is dangerous and may result in tank breakage or bursting. Excessive temperature, however, is even more dangerous and will usually result in a serious explosion. In either event, capacity of the relief valve must be adequate to handle a greater relief than the input capacity of the heater. Possible causes for excessive pressure or temperature are well known and need not be dwelt upon here.

It is particularly my purpose to make a temperature and pressure relief control having a single unit casting body which requires only one tank tapping and is readily adapted to be mounted on any tank. This is a great improvement over controls of this general type which require two or more tappings of the tank. My unitary body makes for ease of installation and general simplification of design and construction.

It is a further purpose to provide such a control having a pilot valve mechanism, which mechanism is mounted in the unit body and includes a temperature sensitive pilot. The pilot valve mechanism has important features of structure which make possible the easy replacement of the pilot valve mechanism without breaking the main line connection, and with a maximum of convenience.

It is an object of the present invention to provide an arrangement whereby the pilot valve mechanism, including a temperature sensitive bulb, is thoroughly protected and free from sedimentation.

Another object is to provide a pilot valve arrangement actuated by high pressure as well as high temperature.

Another object is to provide a diaphragm and spring-seated valve, subject to direct pressure from the tank to permit high volume discharge of hot water, and also subject to operation by pressure when the pilot valve is open on account of either high pressure or high temperature. This second valve structure is mounted in the unitary body.

It is my purpose to provide a structure for the second valve mounting which permits its easy removal and replacement without a break in the main line connection.

It is also my purpose to provide in the second valve structure means for preventing spinning of the valve disk and to provide means for the resealing of the valve disk in the same spot each time.

A further object is to provide a readily removable valve seat for the second valve.

Still a further object is to provide such a unitary body particularly adapted for use with a fusible plug, and to provide in some instances such a fusible plug as a part of the structure.

With these and other objects in view, my invention consists in the construction, arrangement and combination of the various parts of my control valve whereby the objects contemplated are attained, as hereinafter more fully set forth, pointed out in my claims and illustrated in the accompanying drawings, wherein:

Figure 1 is a diagrammatic view of a conventional hot water supply system with my invention applied to it.

Figure 2 is a vertical sectional view through a temperature and pressure relief control embodying my invention.

Figure 3 is a top or plan view of the control.

Figure 4 is a horizontal sectional view taken on the line 4—4 of Figure 2, illustrating the removable seat for the second valve and valve guide member.

Figure 5 is a horizontal, sectional view taken on the line 5—5 of Figure 2 illustrating the valve seat yoke with a pilot valve and the pilot valve disk guide.

Figure 6 is a plan view of the diaphragm yoke for the second valve, and

Figure 7 is a vertical sectional view illustrating a slightly modified form of the unit body with a safety fuse plug structure mounted thereon.

In Figure 1 I have shown a hot water tank 10, having a cold water inlet pipe 12 and a hot water outlet pipe 14.

By way of diagrammatic illustration, there is shown a heater leg consisting of the pipe 16 leading from the bottom of the tank 10 and a pipe

18 connected to the hot water outlet 14 and thus to the top of the tank. The pipes 16 and 18 are respectively connected to the bottom and top of a conventional water heater 22.

My temperature and pressure relief valve has a unitary body indicated generally at 24 in Figs. 2 and 3, and made of a single casting or the like. The body 24 has a projecting ported member 26 which may have a screw threaded end 28 screwed into a coupling 30 adapted to be tapped into a wall of the tank 10. The body 24 is hollow and has a partition 32 extending across it.

Connected with the partition 32 is a partition 34 forming one end and a bottom of a chamber 36. The body 24 has another chamber 38 communicating with the passage 40 through the ported member 26.

Pilot valve assembly

The partition 32 has an opening 42. A pilot valve seat 43 is formed on a valve seat yoke 44 which is screwed into the opening 42 and has a tubular extension 46 projecting down into the chamber 38. The extension 46 is provided with openings 49 in its top and with openings 50 in its lower end and is closed at its lower end by a threaded plug 52 having a central opening 54 for the bulb extension hereinafter described.

Resting on the plug 52 is a bellows type thermostatic member 56 having a tubular extension 58 projecting through the hole 54 in the plug 52 and downwardly through the passage 40. Extension 58 projects below the coupling 30 so that its lower end will be in the tank 10. On the upper end of the thermostatic bellows 56 is a projecting guide 60.

In the body 24 above the partition 32 is a chamber 62. Screwed into the body 24 above the chamber 62 and above the valve seat yoke 44 is a coupling 64. Into the end of the coupling 64 is screwed a tubular spring cage 66 forming part of the pilot valve assembly. This spring cage 66 has a reduced tubular upward extension 68 externally and internally threaded.

A tubular member 70 has threaded connection with the outer screw threads of the extension 68 and projects above it. In the member 70 near its upper end is an annular shoulder 72 on which is seated a packing ring 74 above which is a packing gland 76 screwed into the member 70.

A hollow adjusting screw 78 has threaded connection with the internal threads of the extension 68 and extends above and below that extension.

A stem 80 extends through the gland 76 and the spring cage 66 and the coupling 64. The lower end of the stem 80 is threaded to the pilot valve disk holder 82 in the underface of which is seated the pilot valve disk 84 for cooperation with the seat 43. A disk guide 83 is loosely mounted in the valve seat yoke 44 and has a cylindrical extension 85 extended through the disk valve 84 and threaded into the pilot valve disk holder 82. The disk guide 83 has a downwardly projecting tubular portion 87 which loosely receives the guide member 60 on top of the bellows 56 and against which the bellows bears when expanded.

Loosely mounted on the stem 80 below the adjusting screw 78 is a spring seat 86. On the stem 70 between the spring seat 86 and the pilot valve disk holder 82 is a coil spring 88 which tends to yieldingly hold the pilot valve disk 84 against the seat 43.

High volume pressure discharge valve

I shall now describe the high volume pressure discharge valve which is subject to pressure from the tank, and also functions in cooperation with the pilot valve heretofore described.

In the partition 34 is a valve opening 92. Into the opening 92 is threaded a valve seat yoke 94 on which is formed a valve seat 96.

One of the important features of my present invention is the unit assembly of the valve which cooperates with this seat and the diaphragm and diaphragm yoke now to be described.

The body 24 has a relatively large opening 98 which may, for convenience, be called a diaphragm opening. The valve and diaphragm assembly mentioned is received in the chamber 36 heretofore mentioned, below a spring cage 100 which is arranged above the diaphragm opening 98 and secured to the body 24 by cap screws 102.

A flexible diaphragm 104 has its peripheral edge gripped between the spring cage 100 and the body 24. On the underside of the diaphragm 104 is a lower diaphragm plate 106 which has a cylindrical portion 108 extending upwardly through the diaphragm and externally screw-threaded into the top diaphragm plate 110. The lower diaphragm plate 106 has an internally threaded downward cylindrical extension 112 which receives a lift rod valve stem 114 loosely held in place by a nut 116 screwed into the extension 112 on the underside of the lower diaphragm plate 106.

A diaphragm yoke 118 is seated on partition 32 and closes the opening 120 in that partition. The diaphragm yoke 118 and the diaphragm form an enclosed chamber 119. The diaphragm yoke has openings 121 by which the chamber 119 communicates with the chamber 62.

The diaphragm yoke 118 has a flange 122 seated on the body 24 below the diaphragm 104 and held firmly in place by the cap screws 102 which extend through the flange 124 on the spring cage 100 as well as through the diaphragm 104 and the flange 122 and are screwed into the body 24. It will of course be understood that proper gaskets are provided wherever necessary in the control.

The lift rod valve stem 114 extends loosely through an opening 126 in the diaphragm yoke 118 so as to permit leakage and yet be properly guided with some play. The lower end of the stem 114 has a screw-threaded opening 128 which receives the shank of a headed lift rod stem screw 130. A lower lift rod stem nut 132 receives the head of the screw 130, as shown in Fig. 2, and has a threaded connection with the high volume pressure discharge valve disk holder 134. In the underside of the disk holder 134 is received the valve disk 136 which cooperates with the seat 96. The disk holder 134 has a central downwardly extending internally threaded hollow tubular extension 138. The disk guide 140 has a threaded reduced upward extension 142 threaded into the extension 138, and is loosely slidable in the valve seat yoke 94.

As shown in Fig. 4, the opening through the seat 96 and valve seat yoke 94 indicated at 144, is preferably round and the disk guide 140 is plural-sided so that the guide may perform its proper function as a guide and permit free flow of fluid. The guide 140 has the flange 146 to receive a wrench. The body 24 has a port 148 communicating with the chamber 36 and adapted to be connected with a drain pipe.

Normal adjustable closing pressure on the valve disk 136 is maintained by means of a coil spring 150 seated on the upper diaphragm plate 110. On the upper end of the spring 150 is a spring seat 152. An adjusting screw 154 is threaded through the spring cage 100 and bears on the seat 152 for adjusting the tension of the spring 150. A lock nut 156 may be provided on the screw 154.

Pivoted to the end of the stem 80 which projects above the packing gland 76 is a lever handle 158, having on one end a cam 160 whereby when the lever handle 158 is moved to one position, the cam 160 will bear against the packing gland 76 and open the valve 84. The valve 84 can thus be manually controlled for maintaining it in open position when desired.

In Fig. 7 is shown a vertical, sectional view through a modified form of my control illustrating the manner in which a fusible plug may be used with the control.

The body 24a indicated in Fig. 7 is formed with a hollow projecting member 162 into which is screwed a plug 164 having a shoulder 166 seated against a shoulder 168 on the interior of the member 162. The plug 164 has a passage 170 communicating with a port 172 in the member 162 and with the interior of the body 24a. The inner end of the passage 170 receives and encloses a fusible member 174.

*Practical operation*

The pilot valve disk 84 is subject to actuation by high temperature and also by high pressure in the tank 10. The pressure in the tank tends to lift the valve disk 84 off its seat. This tendency is opposed by the tension of the spring 88. That tension may be regulated by adjusting the screw 78 after removing the tubular member 70.

The valve disk 84 is also subject to operation by reason of high temperature in the tank. The bellows 56 with its extension 58 is very sensitive to temperature. Upon rise in temperature the bellows 56 expands and bears against the extension 87 of the disk guide 83. Whenever the temperature in or pressure from the tank exceeds the value for which the spring 88 is set, the valve 84 rises, allowing water to flow out of the tank into the chamber 62.

As shown in Fig. 5 the disk guide 83 is of such shape as to allow flow of water past it through the valve seat yoke 44. The water flows through the openings 121 into the chamber 119 and the pressure of the water then raises the diaphragm 104 against the tension of the spring 150 and the valve 136 is raised to allow free flow of water from the tank.

The lift rod valve stem 114 has sufficient play where it passes through the diaphragm yoke 118 to allow water in the chamber 119 to flow into chamber 36 and out through the port 148 when the valves 84 and 136 are again seated.

As the hot water flows off, cold water comes into the tank for cooling the tank. The temperature at which the thermostatic bellows 56 opens the valve 84 can be determined by methods known to the art as by selecting the substance used in filling the bellows and its extension, and by adjustment of the tension of the spring 88.

The valve 136 is also subject to pressure from the tank. Thus, in addition to allowing free flow of water when the pilot valve is operated, it affords an additional safety means for permitting the tank to be relieved in case the pressure becomes too great or in case the pilot valve should for any reason fail to operate.

It will of course be understood that the tension of the spring 150 is adjustable through the medium of the screw 154. The fusible member 174 affords a further safety feature for relieving hot water in the tank if the temperature gets too high and the temperature relief valve system should not operate properly.

A very important advantage of my improved control lies in the construction whereby the single unit body can be mounted on the tank at one place only. This makes for convenience in installation and is very important. By mounting all the operating mechanism in a single body, the parts are readily and easily held in their proper relationship.

Another important advantage is found in the pilot valve assembly. It will be noted that the parts are so proportioned and the openings so sized that the various working parts can be quickly and easily removed for purposes of repair and replacement. For example, by removing the tubular member 70 access is given to the adjusting screw 78 for either adjusting it or replacing it. By screwing off the spring cage 66 and coupling 64, the entire interior assembly can be removed for replacing or repairing the disk 84, or the thermostatic bellows 56. All this can be done without breaking the main connection with the tank or the drain pipe.

Another important advantage is found in the construction of the diaphragm yoke, diaphragm and valve disk 136. Before assembling these parts in the body 24, they can be assembled together. This whole assembly can be quickly and easily removed by taking out the cap screws 102 and removing the spring cage 100. It will be noted that when this is done, access can be had to the valve seat yoke 94 for removing and repairing or replacing the valve seat, and all parts of the assembly mentioned, including the diaphragm, diaphragm yoke, diaphragm plates, lift rod, valve stem 114 and the parts connected with and extending below it, will then be readily accessible.

The size of the opening 120 and the size of the opening 98 are such as to permit the entire assembly to be simply lifted out of the body 24. This can be done without removing the body 24 from the tank or disconnecting it from the drain pipe.

I have described my control in a form in which it may be practically embodied and in which it has been built, but it is my purpose to avoid limitations to details of structure and to cover by my claims any modifications in the parts and their arrangement which may be reasonably included within the spirit and scope of my invention and my claims.

I claim:

1. In a control of the kind described, a unit body having a ported portion for a single connection with a tank and a port for connection with a pipe and a chamber communicating with the ported portion and a second chamber communicating with the second port, having a valve opening between the first chamber and second chamber, and having a third chamber with a valve opening communicating with the first chamber and with an opening into the second chamber and a diaphragm receiving opening, a valve seat removably mounted in the opening between the third and first chambers, formed with a tubular extension projecting into the first chamber having an opening in its wall near the valve seat proper and an opening in its wall adjacent its end farthest from the valve seat proper, a removable closure in said last-named end of the tubular extension, a thermostatic bellows in said tubular extension seated on said closure and provided with a reduced tubular extension extending through the closure and the first-named ported portion of the body, a valve to cooperate with said seat, a guide extending from the valve through the valve seat, adapted to cooperate with the bellows, said body having, aligned with the opening between the first and third chambers, an opening large enough for the passage of the valve seat and valve and bellows, a spring cage removably mounted on the body in said last-described opening, a spring in said cage for biasing said valve toward closed position, means for varying the tension on said spring, a valve for controlling flow from the first to the second chamber sensitive to and opened by pressure in the first chamber, means for closing the opening between the second and third chambers having bleeder means for allowing limited flow from the third to the second chamber, and a diaphragm for closing said diaphragm receiving opening, operatively connected with the second valve and subject to pressure in the third chamber, said diaphragm being adapted to open said second valve upon predetermined pressure in said third chamber.

2. In a control of the kind described, a unit body having a ported portion for a single connection with a tank and a port for connection with a pipe and a chamber communicating with the ported portion and a second chamber communicating with the second port, having a valve opening between the first chamber and second chamber, and having a third chamber with a valve opening communicating with the first chamber and with an opening into the second chamber and a diaphragm receiving opening, a valve seat removably mounted in the opening between the third and first chambers, formed with a tubular extension projecting into the first chamber having an opening in its wall near the valve seat proper and an opening in its wall adjacent its end farthest from the valve seat proper, a removable closure in said last-named end of the tubular extension, a thermostatic bellows in said tubular extension seated on said closure and provided with a reduced tubular extension extending through the closure and the first-named ported portion of the body, a valve to cooperate with said seat, a guide extending from the valve through the valve seat, adapted to cooperate with the bellows, said body having, aligned with the opening between the first and third chambers, an opening large enough for the passage of the valve seat and valve and bellows, a spring cage removably mounted on the body in said last-described opening, a spring in said spring cage for biasing said valve toward closing position, an adjusting screw in said spring cage for regulating the tension of said spring, a tubular member on said cage removably mounted to allow access to the adjusting screw, a valve for controlling flow from the first to the second chamber sensitive to and opened by pressure in the first chamber, means for closing the opening between the second and third chambers having bleeder means for allowing limited flow from the third to the second chamber, and a diaphragm for closing said diaphragm receiving opening, operatively connected with the second valve and subject to pressure in the third chamber, said diaphragm being adapted to open said second valve upon predetermined pressure in said third chamber.

3. In a control of the kind described, a unit body having a ported portion for a single connection with a tank and a port for connection with a pipe and a chamber communicating with the ported portion and a second chamber communicating with the second port, having a valve opening between the first chamber and second chamber, and having a third chamber with a valve opening communicating with the first chamber and with an opening into the second chamber and a diaphragm receiving opening, a valve seat removably mounted in the opening between the third and first chambers, formed with a tubular extension projecting into the first chamber having an opening in its wall near the valve seat proper and an opening in its wall adjacent its end farthest from the valve seat proper, a removable closure in said last-named end of the tubular extension, a thermostatic bellows in said tubular extension seated on said closure and provided with a reduced tubular extension extending through the closure and the first-named ported portion of the body, a valve to cooperate with said seat, a guide extending from the valve through the valve seat, adapted to cooperate with the bellows, said body having, aligned with the opening between the first and third chambers, an opening large enough for the passage of the valve seat and valve and bellows, a spring cage removably mounted on the body in said last-described opening, a spring in said spring cage for biasing said valve toward closing position, an adjusting screw in said spring cage for regulating the tension of said spring, a tubular member on said cage removably mounted to allow access to the adjusting screw, a stem on said valve extending through said spring, spring cage and tubular member, and a cam lever handle pivoted on said stem for manual adjustment to valve-opening position, a valve for controlling flow from the first to the second chamber sensitive to and opened by pressure in the first chamber, means for closing the opening between the second and third chambers having bleeder means for allowing limited flow from the third to the second chamber, and a diaphragm for closing said diaphragm receiving opening, operatively connected with the second valve and subject to pressure in the third chamber, said diaphragm being adapted to open said second valve upon predetermined pressure in said third chamber.

4. In a control of the kind described, a unit body having a ported portion for a single connection with a tank and a port for connection with a pipe and a chamber communicating with the ported portion, and a chamber communicating with the second port, having a valve opening between the first chamber and second chamber, and having a third chamber with a valve opening communicating with the first chamber and with an opening into the second chamber and a diaphragm receiving opening, pilot valve for controlling flow from the first to the third chamber, said pilot valve being sensitive to and opened by predetermined pressure in the first chamber, thermal means for opening said pilot valve on predetermined maximum temperature in said first chamber, a removable valve seat mounted in the opening between the first and second chambers, a second valve for cooperating with said removable seat, a diaphragm in the diaphragm opening, a diaphragm yoke supported on said body projecting through the diaphragm opening and closing the opening between the second and third chambers, and arranged to allow flow from the third chamber to the diaphragm, a lift rod valve stem removably connected to the diaphragm and removably connected to the second valve and loosely extended through the diaphragm yoke to allow bleeder passage from the third to the second chamber, a spring for biasing the diaphragm toward valve-closing position, a spring cage for said spring removably mounted on said body, an adjusting screw mounted on the spring cage for adjusting the tension on the spring, said diaphragm opening being of such size that upon removal of the spring cage, the diaphragm yoke and valve assembly may be removed therethrough and access had for manipulation or removal of the valve seat.

BURCHARD E. HORNE.

REFERENCES CITED

The following references are of record in the file of this patent:

UNITED STATES PATENTS

| Number | Name | Date |
|---|---|---|
| 1,575,725 | Stewart | Mar. 9, 1926 |
| 1,927,036 | Johnson | Sept. 19, 1933 |
| 1,936,362 | Kennedy | Nov. 21, 1933 |
| 1,965,307 | Darling | July 3, 1934 |
| 1,987,032 | Spence | Jan. 8, 1935 |
| 2,003,828 | Ey | June 4, 1935 |
| 2,214,963 | Jurs | Sept. 17, 1940 |
| 2,223,115 | McDermott | Nov. 26, 1940 |
| 2,283,513 | Smith | May 19, 1942 |
| 2,308,165 | Fields | Jan. 12, 1943 |
| 2,351,190 | Carlson | June 13, 1944 |
| 2,389,437 | Kmiecik | Nov. 20, 1945 |
| 2,408,708 | Tweedle | Oct. 1, 1946 |

FOREIGN PATENTS

| Number | Country | Date |
|---|---|---|
| 3,435 | Great Britain | Oct. 22, 1873 |